May 3, 1966   H. L. ORWIG   3,249,174
TWO-SPEED HYDRAULIC STEERING SYSTEM
Filed Jan. 7, 1964
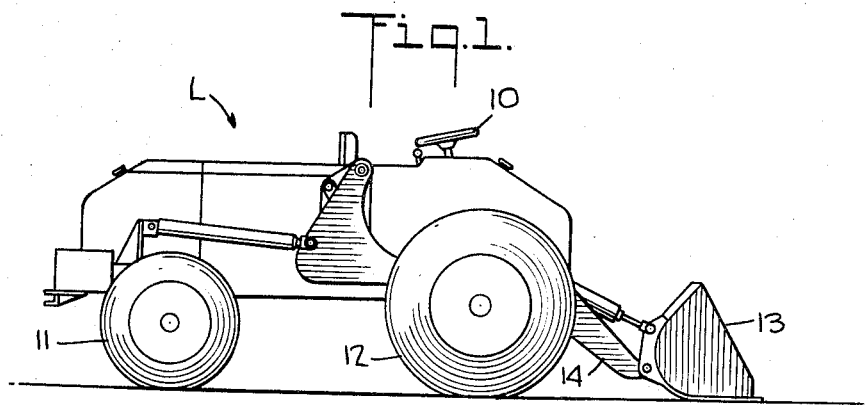
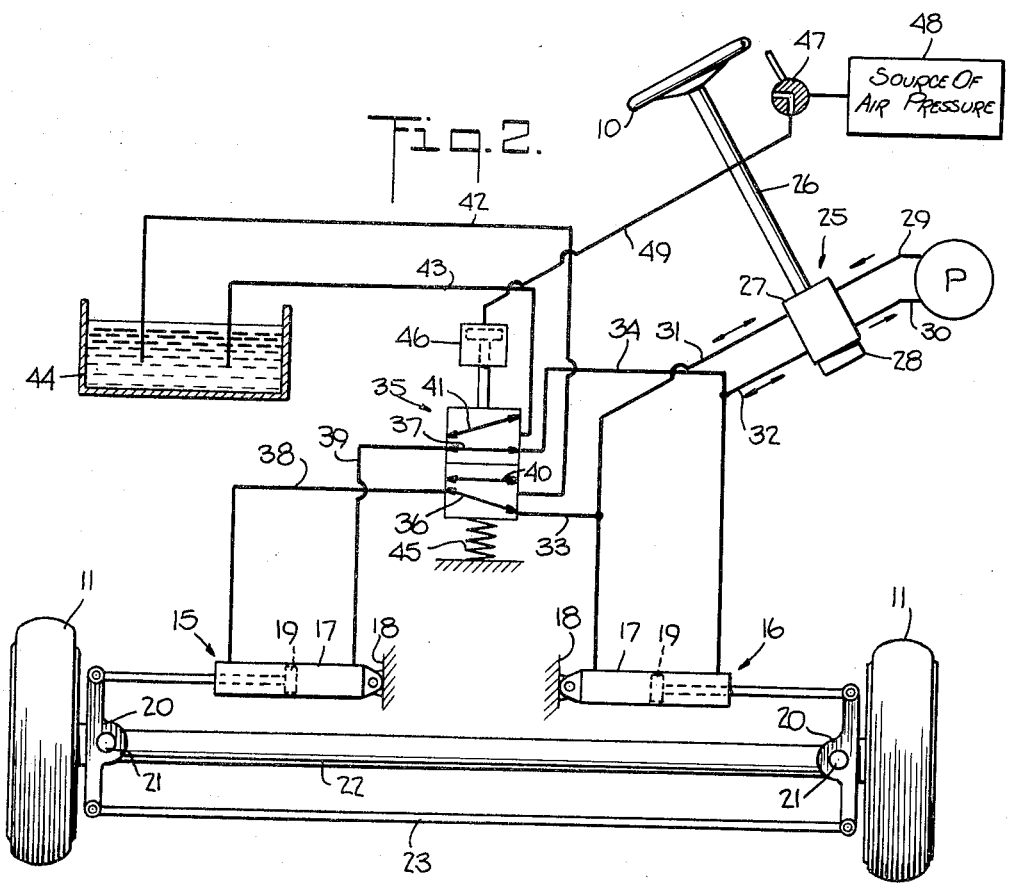
INVENTOR.
H. L. ORWIG
BY
ATTORNEY

United States Patent Office 3,249,174
Patented May 3, 1966

3,249,174
TWO-SPEED HYDRAULIC STEERING SYSTEM
Herbert L. Orwig, Chili, N.Y., assignor to Yale & Towne, Inc., New York, N.Y., a corporation of Ohio
Filed Jan. 7, 1964, Ser. No. 336,196
7 Claims. (Cl. 180—79.2)

This invention relates to a novel hydraulic steering system that will operate at different rates of steering speed.

As will be recognized by those skilled in the art, there are in use some types of vehicles that have a particular need to turn rapidly at times, while at other times turning more slowly so as to allow better steering control. A tractor loader, for example, must have rapid steering in order to maneuver efficiently during loading and unloading operations, but will not steer well when traveling at a substantial speed unless the steering is slow as compared to the movements of the manual steering wheel or control means. The novel steering system that I have conceived will very effectively contribute both fast and slow speeds of hydraulic steering. In effect, my system will provide different steering ratios that the driver of the vehicle may use selectively, enabling the vehicle to operate with much better efficiency.

In my invention, I utilize a pair of steering hydraulic rams for imparting steering movements to a wheel of a vehicle. A steering controller will direct a flow of fluid pressure toward each of the rams so that both rams may act simultaneously to steer the wheel, the controller being effective to control the movements of the wheel between opposed angular steering positions. I particularly utilize a control that may be actuated to direct all of the fluid flow from the controller to one of the hydraulic steering rams, increasing the flow in respect to that ram while functionally disconnecting the other ram. That naturally causes faster steering movements of the vehicle wheel between its opposed steering positions. Thus, as one feature of my invention, I selectively apply all or a part of a controlled fluid flow to a steering hydraulic ram, whereby to steer a wheel at different speeds in respect to the operation of a steering controller.

As a further feature, I utilize a hydraulic steering controller of a type that will cause fluid to flow in an amount that is substantially in proportion to the movements of a steering handle. Together with the controller I utilize flow dividing means which may be actuated selectively to direct one or more predetermined parts of the flow from the controller to a steering ram. Thus, it may be said that I utilize hydraulic means to effect different steering ratios between a steering handle and a steering ram, or vehicle wheel that is moved by the ram.

The concept of my invention actually is extremely simple, and will merely require standard parts or assemblies that are commercially available. Thus, the steering handle may operate a standard hydraulic controller of the positive displacement type. The controller may control a flow of fluid pressure that is supplied from a usual source on the vehicle, or may itself generate a flow of pressure. Each steering ram can be a standard ram, and I merely need employ a usual type of selector valve for controlling the flow of fluid pressure from the hydraulic controller. Nevertheless, my novel steering system will be exceedingly effective, and will increase to a very considerable extent the operating efficiency of a tractor loader or other vehicle on which it may be used.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing:
FIG. 1 shows a side view of a tractor loader on which I utilize my novel hydraulic steering system.
FIG. 2 shows my novel system diagrammatically.

Referring particularly to FIG. 1 of the drawing, I show a tractor loader L having a usual construction including a manually operated steering handle or wheel 10, a pair of ground engaging rear wheels 11 that are mounted for steering movement, and a pair of front drive wheels 12, it being understood that only the wheels at one side of the loader can be seen in FIG. 1. A load buckle 13 is mounted on lifting arms 14 at the front of the loader L. As I shall describe in detail, my novel steering system will enable the steering wheel 10 to steer the rear wheels 11 rapidly through a wide angle, so that the loader L can very effectively maneuver the bucket 13 during loading and unloading operations. Further, my system will enable the driver to select a relatively high steering ratio that will contribute much better steering when the loader L needs to travel at a substantial speed.

The higher steering ratio may sometimes be used to advantage when maneuvering at a low speed, as when difficult ground conditions make it desirable to have more steering power. Generally speaking, less steering power may be required when the bucket 13 supports a load, since the load will tend to relieve the weight that is placed on the rear steered wheels 11. In any case, my novel hydraulic steering system will enable the driver to select at any time the steering ratio that he wishes to use between the steering wheels 10 and the steered wheels 11.

I shall now describe my steering system while referring to FIG. 2. In my preferred construction, I utilize a pair of steering hydraulic rams 15, 16 that may be identical, although that is not essential. Each ram 15, 16 has a cylinder 17 that is pivoted to a relatively fixed part 18 on the loader or vehicle, and a piston 19 that is connected to a wheel mounting 20 for a corresponding wheel 11. The wheel mountings 20 support the wheels 11 for steering rotation about king pins 21 that are arranged in a usual way on opposed ends of an axle 22. A tie rod 23 connects the wheel mountings 20 to hold wheels 11 in aligned relation to each other as they are steered, and it will be seen that each of the steering rams 15, 16 may be effective to impart steering movement to both of the wheels 11. Actually, I may utilize the rams in my novel system for steering one or more wheels, as may be appropriate on a particular type of vehicle, and I do not wish to be limited to the steering of two wheels. It is merely necessary to know that the two steering hydraulic rams 15, 16 which I show in FIG. 2 may act simultaneously to move a wheel between opposed steering positions.

My novel system further includes a hydraulic controller, indicated diagrammatically at 25, that the steering wheel 10 will operate through a shaft 26. In the construction that I prefer, the controller 25 is a positive displacement type of controller like that shown in the reissue patent to Lynn L. Charlson, No. 25,126. That controller is commercially available, and includes a valve mechanism 27 and positive displacement metering means 28 that are controlled through the operating shaft 26.

I believe it will be unnecessary to describe the controller 25 in great detail, because its construction is well set forth in the patent. However, I shall indicate that the valve mechanism 27 is of an "open center" type, which in a normal position allows a pump P to move fluid freely in a circuit through high and low pressure lines 29, 30 between pump P and the controller 25. When the driver of the loader rotates the steering wheel 10, the operating shaft 26 will cause the valve mechanism 27 to place lines 29, 30 in circuit with lines 31, 32 that are connected to controller 25. The high pressure then will flow from line 29 to line 31 or to line 32, depending on the direction in which steering wheel 10 is rotated, the low pressure returning from the opposed line 32 or 31 to the line 30. The metering means 28 control the valve mechanism 27 in the manner described in the Charlson patent, so that the amount of fluid that flows to line 31 or 32 is substantially proportional to the extent of movement of steering wheel 10, the flow stopping when wheel 10 ceases to rotate. Thus, the controller 25 will effect a fluid pressure flow that corresponds in direction and amount to the movements of steering wheel 10. Moreover, the controller 25 will do that even through there be no external source of pressure such as the pump P, since the positive displacement metering means 28 is so connected that it may be operated as a pump by the steering wheel 10.

The hydraulic lines 31, 32 extend from the steering controller 25 to opposed ends of the cylinder 17 of hydraulic ram 16, and have corresponding branch lines 33, 34 extending toward opposed ends of the ram 15. The branch lines 33, 34 are controlled by a selector valve, diagrammatically shown at 35 in FIG. 2. Preferably, the selector valve 35 is a standard type of valve which is adapted to connect a pair of hydraulic lines alternately to either of two other pairs of lines. In the position shown in FIG. 2, valve 35 connects the branch lines 33, 34 through passages indicated by arrows 36, 37 to lines 38, 39 extending to opposed ends of the cylinder 17 of steering ram 15. It will be seen that the steering controller 25 then may direct fluid pressure simultaneously to both of the steering rams 15, 16, for steering the wheels 11, the flow being divided so that the wheels will steer at a relatively low speed. Because of the operation of the controller 25 which I have described, the movements of the wheels 11 will be substantially proportional to the movements of steering wheel 10.

The selector valve 35 may be actuated to a downward position, not shown, which will close the branch lines 33, 34 while connecting the lines 38, 39 through passages 40, 41 to lines 42, 43. The lines 42, 43 communicate with a fluid tank 44, allowing a free flow of fluid relatively to the steering ram 15 and relieving that ram of fluid pressure. Since the branch lines 33, 34 now are closed, all of the fluid pressure that the controller 25 applies to lines 31, 32 will be directed to the other steering ram 16. With all of the flow directed to ram 16 while ram 15 merely floats, ram 16 will be effective for steering the wheels 11 at a faster speed between their opposed steering positions. Whether the flow is applied all to the ram 16 or is divided so that only a part is applied to ram 16, the steering of the ground engaging wheels 11 will be substantially proportional to the movements of the steering handle or wheel 10. Therefore, it will be seen that the selector valve 35 may be moved to effect either a high or low steering ratio between the steering wheel 10 and the steered wheels 11.

Means for moving the selector valve 35 may easily be arranged by those persons skilled in the art. That valve may be actuated electrically or through direct manual operation, but for the purposes of disclosure I indicate a spring 45 for moving the valve 35 to one position, and a pneumatic cylinder 46 for moving the valve to the opposed position. The cylinder 46 will be actuated through a manual valve 47 that may be located in a position which is convenient to the driver, and that will direct air pressure from a source 48 through a line 49 to the cylinder 46. Thus, the driver of the loader may, merely by moving the valve 47, select the steering ratio that he wishes to use at any time.

I believe that the operation and advantages of my novel hydraulic steering system will now be clearly understood. My invention enables me, while utilizing extremely simple means, to construct a system that will allow a driver to select either fast or slow steering speeds, as he may desire. My system actually will contribute different steering ratios through hydraulic means, which utilize standard components that are commercially available. Thereby the driver of a loader may very easily utilize the steering power and the steering ratios that will enable him to operate the loader most efficiently under the different conditions that may be encountered. I believe, therefore, that the very considerable value of my novel hydraulic system will be fully understood, and that the merits of my invention will be fully understood by those skilled in the art.

I now claim:

1. In a vehicle of the class described having a ground engaging wheel that is mounted for steering movement between opposed angular steering positions, a pair of steering hydraulic rams for imparting steering movements to said wheel, a steering handle, means whereby rotation of said steering handle directs fluid pressure simultaneously toward both said hydraulic rams for steering the wheel on its mounting, and a selectively actuated control for said means for directing all of the fluid pressure to one of said rams, whereby to effect faster steering movements of said wheel between its opposed steering positions.

2. In a vehicle of the class described having a ground engaging wheel that is mounted for steering movement between opposed angular steering positions, a pair of steering hydraulic rams for imparting steering movements to said wheel, a steering handle, means whereby rotation of said steering handle directs fluid pressure simultaneously toward both said hydraulic rams for steering the wheel between its opposed positions, and a selectively actuated control for said means for directing all of the fluid pressure to one of said rams, while rendering the other of said rams free floating.

3. In a vehicle of the class described having a ground engaging wheel that is mounted for steering movement between opposed angular steering positions, a pair of steering hydraulic rams for imparing steering movements to said wheel, a steering handle, means whereby rotation of said steering handle directs fluid pressure simultaneously towards both said hydraulic rams for steering the wheel between its opposed positions on its mounting, and a selectively actuated control for said means for directing all of the fluid pressure to one of said rams, while functionally disconnecting the other of said arms from said wheel.

4. In a vehicle of the class described having a ground engaging wheel that is mounted for steering movement between opposed angular positions, a pair of steering hydraulic rams connected to the wheel, a steering handle, a hydraulic steering controller operated by said handle to effect a fluid pressure flow, means directing a part of said flow toward each of said rams simultaneously for steering the ground engaging wheel in controlled relation to the steering handle, and a selector valve means for directing both parts of the flow to one of said rams while rendering the other ram free floating, so that said other ram will steer the wheel in a second controlled relation to the steering handle.

5. In a vehicle of the class described having a ground engaging wheel that is mounted for steering movement between opposed angular positions, a steering hydraulic ram connected to the wheel, a steering handle, a hydraulic steering controller operated by said handle to effect a fluid pressure flow, means dividing said flow into parts and directing a divided part of said flow to said steering ram for steering the ground engaging wheel between its opposed steering positions, and selector valve means for directing a further part of the divided flow to said steering ram so that said ram will steer the wheel at a faster rate.

6. In a vehicle of the class described having a ground engaging wheel that is mounted for steering movement between opposed angular positions, a pair of steering hydraulic rams connected to the wheel, a steering handle, a hydraulic steering controller operated by said handle to effect a fluid pressure flow, means directing a part of said flow toward each of said rams for steering the ground engaging wheel on its mounting, a selector valve means between said controller and one of said rams, and means for actuating said valve means to direct both parts of the flow toward the other of said rams while relieving said one ram from fluid pressure, so that said other ram will act at a faster rate to steer the wheel between its opposed positions while said one ram moves freely.

7. In a vehicle of the class described having a ground engaging wheel that is mounted for steering movement between opposed angular positions, a pair of steering hydraulic rams connected to the wheel, a source of fluid pressure, a steering handle, a positive displacement hydraulic controller operated by the steering handle and controlling the fluid pressure so as to effect a flow of fluid substantially in proportion to the movements of said handle, means dividing the proportional flow into two parts and directing a divided part to each of said rams whereby to effect a first steering ratio between the steering handle and the ground engaging wheel, a selector valve between said controller and one of said rams, and means for actuating said selector valve to direct both divided parts of the proportional flow toward the other of said rams while relieving said one ram from fluid pressure, so that said steering handle will act with a lower steering ratio through said other ram to steer the wheel between its opposed angular positions.

References Cited by the Examiner
UNITED STATES PATENTS

| | | | |
|---|---|---|---|
| 2,624,361 | 1/1953 | Brown | 60—52 |
| 2,708,344 | 5/1955 | Greer | 180—79.2 X |
| 2,732,168 | 1/1956 | Greenley. | |
| 2,737,196 | 6/1956 | Eames. | |
| 2,783,849 | 6/1957 | Armington et al. | 180—79.2 |
| 2,837,107 | 6/1958 | Rockwell | 60—52 X |
| 2,899,006 | 8/1959 | Brown et al. | 180—79.2 |
| 2,945,544 | 7/1960 | Jacobus | 180—79.2 |
| 2,984,215 | 5/1961 | Charlson | 91—467 |
| 3,185,245 | 5/1965 | Hoyt | 180—79.2 |

KENNETH H. BETTS, *Primary Examiner.*